(12) United States Patent
Fardig et al.

(10) Patent No.: US 9,826,064 B2
(45) Date of Patent: Nov. 21, 2017

(54) SECURING SENSITIVE DATA BETWEEN A CLIENT AND SERVER USING CLAIM NUMBERS

(71) Applicant: LENOVO (Singapore) PTE, LTD., New Tech Park (SG)

(72) Inventors: Matthew William Fardig, Boonville, IN (US); Travis Lee Ennis, Jasper, IN (US); Roger Alan Thomas, GreenCastle, IN (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/628,997

(22) Filed: Feb. 23, 2015

(65) Prior Publication Data
US 2016/0248887 A1 Aug. 25, 2016

(51) Int. Cl.
*H04L 29/06* (2006.01)
*G06F 21/60* (2013.01)
*H04L 29/08* (2006.01)

(52) U.S. Cl.
CPC .......... *H04L 67/42* (2013.01); *G06F 21/606* (2013.01); *H04L 63/04* (2013.01); *H04L 63/0428* (2013.01); *H04L 63/08* (2013.01); *H04L 63/12* (2013.01); *H04L 67/141* (2013.01); *H04L 69/28* (2013.01)

(58) Field of Classification Search
CPC ....................................................... H04L 63/04
See application file for complete search history.

(56) References Cited

U.S. PATENT DOCUMENTS

| | | | | |
|---|---|---|---|---|
| 5,825,890 A * | 10/1998 | Elgamal | .................. | H04L 29/06 380/282 |
| 6,170,017 B1 * | 1/2001 | Dias | ........................ | H04L 29/06 709/226 |
| 6,578,199 B1 * | 6/2003 | Tsou | ......................... | G06F 8/61 717/174 |
| 7,502,860 B1 * | 3/2009 | Champagne | ............ | H04L 47/10 370/252 |
| 2004/0010545 A1 * | 1/2004 | Pandya | .................... | H04L 29/06 709/203 |
| 2004/0260769 A1 * | 12/2004 | Yamamoto | ........ | G06F 17/30902 709/203 |
| 2006/0005026 A1 * | 1/2006 | Song | ..................... | H04L 9/0844 713/173 |
| 2006/0059168 A1 * | 3/2006 | Hamada | .............. | H04L 12/2803 |
| 2006/0195545 A1 * | 8/2006 | Kikkawa | ........... | H04L 29/06027 709/217 |
| 2012/0011596 A1 * | 1/2012 | Kim | ........................ | G06F 21/10 726/30 |

(Continued)

*Primary Examiner* — Jason C Chiang
(74) *Attorney, Agent, or Firm* — Kunzler P.C.

(57) ABSTRACT

For securely transferring session information between a client and a server using claim numbers, a method is provided, including generating a claim number associated with a data session of a local device. The method may further include receiving a claim pickup request from a client application, the claim pickup request including the claim number. The method may also include verifying that the client application is executing on local device, responsive to the claim pickup request, and returning a session information package for the data session based on the claim number, in response to the claim pickup request.

18 Claims, 7 Drawing Sheets

(56) References Cited

U.S. PATENT DOCUMENTS

2014/0046968 A1* 2/2014 Yuan .................. H04L 67/32
                                              707/758
2014/0059059 A1* 2/2014 Barman ............ G06F 17/30017
                                              707/752
2015/0350115 A1* 12/2015 Bergman ............ G06F 13/385
                                              370/216

* cited by examiner

245  Access Request

FIG. 2C

260  Claim Pickup Request

SECURING SENSITIVE DATA BETWEEN A CLIENT AND SERVER USING CLAIM NUMBERS

BACKGROUND

Field

The subject matter disclosed herein relates to session information and more particularly relates to securely transferring session information.

Description of the Related Art

Websites have the ability to pass data to a native client application running on a user's machine. These clients often require sensitive data, such as session related information or other identity related information, to be passed to them, and this data can be easily intercepted.

BRIEF SUMMARY

An apparatus for securely transferring session information is disclosed is disclosed. A method and computer program product also perform the functions of the apparatus.

The apparatus includes a server that includes a processor and a memory. The memory stores code executable by the processor. The code includes code that generates a claim number associated with a data session associated with a local device. The code also includes code that receives a claim pickup request from the local device, the claim pickup request including the claim number. In addition, the code includes code that verifies the local device, responsive to the claim pickup request. The code further includes code that retrieves a sensitive data package for the data session based on the claim number, responsive to verifying the local device.

In some embodiments, the code also includes code that establishes a secure network connection between the server and the local device, wherein the sensitive data package is retrieved in response to establishing the secure network connection. In certain embodiments, the code may also include code that generates the sensitive data package for the data session, and code that securely stores the sensitive data package in a server memory, wherein the claim number points to a location in the server memory storing the sensitive data package. Securely stores the sensitive data package in a server memory may include encrypting the sensitive data package and deleting the sensitive data package in response to the sensitive data package not being retrieved within a predetermined time frame.

In some embodiments, the code also includes code that receives, at the server, an access request from a web browser executing on the local device, code that generates a claim packet in response to receiving the access request, the claim packet including the claim number and a server address, code that encrypts the claim packet, and code that transmits the encrypted claim packet to the client application, wherein the client application transmits the claim pickup request. Verifying the local device may include determining whether the access request and the claim pickup request are received from the same local device. Receiving the claim pickup request may include receiving a claim pickup request addressed to the server address included in the claim packet.

In some embodiments, the code also includes code that initiates a timer in response to generating the claim number, and code that deletes the sensitive data package in response to expiration of the timer. In certain embodiments, the code further includes code that authenticates a user at the local device, wherein generating the claim number occurs in response to authenticating the user. Generating the claim number associated with A method for securely transferring session information may include generating a claim number associated with a data session of a local device. The method may further include receiving a claim pickup request from a client application, the claim pickup request including the claim number. The method may also include verifying that the client application is executing on local device, responsive to the claim pickup request, and returning a session information package for the data session based on the claim number, in response to the claim pickup request.

In some embodiments, the method includes downloading the client application to the local device, wherein the claim number is generated in response to downloading the client application. In certain embodiments, the method includes deleting the session information package in response to the session information package not being retrieved within a predetermined time frame. In some embodiments, the method includes receiving a claim generation request from a web browser executing on the local device, authenticating a user on the local device, and generating the session information package in response to authenticating the user.

In certain embodiments, the method further includes generating a claim packet comprises the claim number and a server address, encrypting the claim packet, and transmitting the encrypted claim packet to the client application, wherein the claim pickup request is received responsive to sending the claim packet. Receiving the claim pickup request may include receiving a claim pickup request addressed to the server address included in the claim packet.

A program product for securely transferring session information is disclosed includes a computer readable storage medium that stores code executable by a processor. The executable code may include code to perform: generating a claim number for sensitive session information related to a local device, receiving a claim pickup request, the claim pickup request including the claim number, verifying that the local device sent the claim pickup request, and returning a session information package to the local device based on the claim number, wherein the session information package includes the sensitive session information. In certain embodiments, the executable code further includes code to perform receiving an access request from the local device, wherein the claim number is generated in response to receiving the access request, wherein verifying the local device comprises comparing a network address associated with the access request with a network address associated with the claim pickup request.

In some embodiments, the executable code further includes code to perform generating a claim packet in response to generating the claim number, the claim packet including the claim number and a server address, encrypting the claim packet, and transmitting the encrypted claim packet to the client application, wherein the claim pickup request is addressed to the server address. In certain embodiments, the executable code further includes code to perform establishing a secure network connection between the server and the local device, wherein returning the session information package comprises transmitting the session information package over the secure network connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
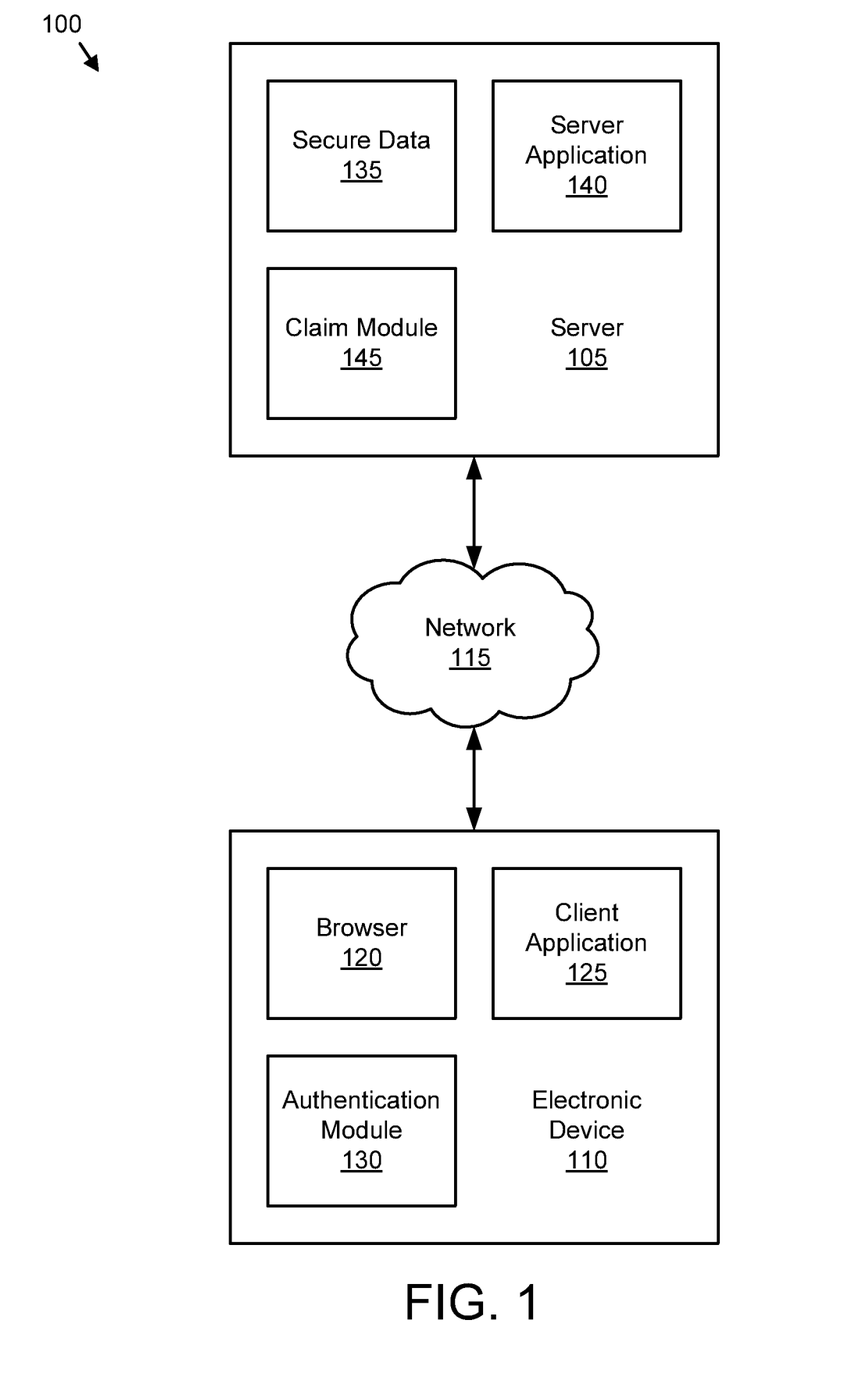
FIG. 1 is a schematic block diagram illustrating one embodiment of an data system for securely communicating sensitive data using claim numbers.

FIG. 1 is a schematic block diagram illustrating one embodiment of a data system 100. The system 100 includes a server 105, an electronic device 110, and a networks 115 through which the server 105 and the electronic device 115 may communicate. The network 115 may be the Internet, a local area network, a wide-area network, a Wi-Fi network, a mobile telephone network, or combinations thereof.

The server 105, in one embodiment, may be a computer system capable of receiving and processing requests from the electronic device 110. In some embodiments, the server 105 may host user data 135. In certain embodiments, the server 105 facilitates sharing of the user data 135 among the plurality of electronic devices 110. In one embodiment, a user of an electronic device 110 may access the user data 135 via the server application 140 and the client application 125.

In some embodiments, the server 105 hosts one or more applications, such as the server application 140. In certain embodiments, the server application 140 may be a website, a client/server application, or the like. In one embodiment, the server application 140 provides computational functionality to the client application 125, such as information processing and/or data hosting. The server 105 may further include a claim module 145 for securing sensitive data between client and server using claim numbers.

The claim module 145 generates a claim number and associates it with sensitive data. In one embodiment, the claim number is a unique value that refers to a secure memory location on the server 105 where the sensitive data is stored. In some embodiments, the claim module 145 stores a mapping of claim numbers to memory locations. In certain embodiments, the claim module 145 initiates a timer in response to creating the claim number, wherein the sensitive data is deleted from the server 105 memory upon expiration of the timer.

The electronic device 110 may be a computer workstation, a laptop computer, a tablet computer, a mobile telephone, or the like. The electronic device 110 may include a browser 120 and a client application 125 which relies on the server application 140 to function. Upon connecting to the server 105, the browser 120 and/or the client application 125 sends a launch request (e.g., a request to access the server 105 and launch the server application 140) and the client application 125 expects to receive sensitive data (including session related information, identity related information, and the like) as plaintext command line parameters. However, if transmitted over the network 115 in plaintext form, the sensitive data is easy to intercept and easy to spoof on another device should an attacker monitor the launch request. If the sensitive data is compromised (e.g., intercepted), the attacker may gain authorized access to the server application 140 from another device, and thus may access and/or compromise the original user's secure data 135.

In some embodiments, the electronic device 110 may include an authentication application 130. The authentication application 130 authenticates the user on the electronic device 110 to the server 105 and may be downloaded from the server 105 or pre-installed on the electronic device 110. In some embodiments, the user's authentication status is tracked by the electronic device 110, for example via a browser cookie.

The browser 120, in one embodiment, is a program installed on the electronic device 110 which facilitates access to data and/or applications stored on the server 105, such as the server application 140. In some embodiments, the browser 120 includes a user interface for accessing, editing, and transferring data over the network 115. In certain embodiments, the browser 120 provides a user interface through which the authentication application 130 authenticates the user to the server 105. In one embodiment, a browser 120 is authenticated with the server 105 in order to access the server application 140.

The embodiments described herein, the server 105 detects an access request (e.g., launch request) from the electronic device 110 via the browser 120, and the claim module 145 generates a claim packet for securely transferring sensitive data between the client application 125 and the server application 140. The claim packet includes a claim number for retrieving sensitive data. The server 105 may also receive a claim pickup request containing the claim number from a client application 125, and return sensitive data associated with the claim number over a secure connection. As a result, sensitive data expected by the client application 125 may be communicated without sending the sensitive data in plaintext over the network 115.

Figure 2A:
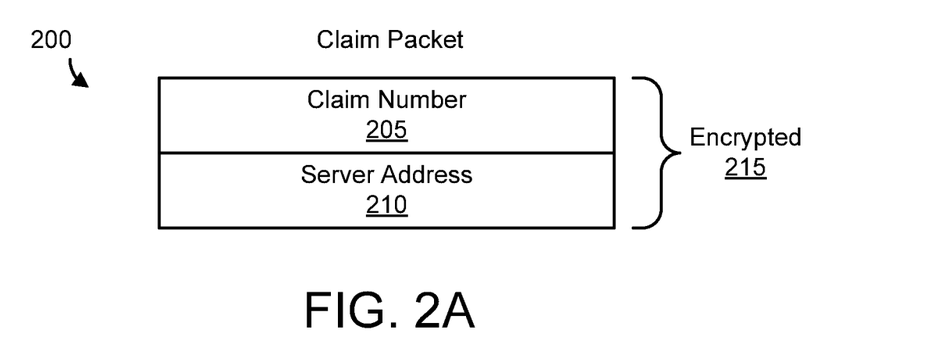
FIG. 2A is a schematic block diagram illustrating one embodiment of a claim packet.

FIG. 2A is a schematic block diagram illustrating one embodiment of a claim packet 200. The claim packet 200 maybe organized as a data structure that is communicated from the server 105 to the electronic device 110 over an unsecured connection. In addition, the claim packet 200 may be stored in a memory of the server 105 and/or of the electronic device 110. In the depicted embodiment, the claim packet 200 includes a claim number 205 and the server address 210. In one embodiment, the claim number 205 and the server address 210 are encrypted 215. For example, the claim packet 200 may be encrypted using a shared secret between the server 105 and the electronic device 110.

In one embodiment, the server 105 generates the claim number 205 in response to receiving a claim generation request from the electronic device 110. In certain embodiments, the claim generation request is a session request for initiating a data session between the server 105 and the electronic device 110, a launch request for launching the server application 140, and/or an access request for access to the user data 135. For example, the electronic device 110 may use the browser 122 access the server 105, wherein the browser 120 generates the claim generation request. In some embodiments, the claim generation request triggers the launching of the client application 125 at the electronic device 110 and initiates a session between the client application 125 and the server application 140.

The claim number 205 is a unique identifier that is used to securely exchange information between the server 105 and the electronic device 110. The claim number 205 points to a memory location of the server 105 where sensitive data for the data session is stored. In some embodiments, the sensitive data is securely stored on the server 105, as will be described hereafter. The server 105 generates a separate claim number 205 for each claim generation request (e.g., access request or launch request) received from an electronic device 110.

The server address 210 is a network address of the server 105. In one embodiment, the server address 210 may be an Internet Protocol (IP) IP address, a logical address, a domain name based address, or combinations thereof. In another embodiment, the server address 210 includes a specific port of the server 105 for receiving a claim pickup request. In some embodiments, the claim number 205 is unique to the server 105 indicated by the server address 210. Accordingly, the claim number 205 can only be used to retrieve sensitive data from the server 105 corresponding to the server address 210 and cannot be used to retrieve sensitive data from any other server 105.

Figure 2B:
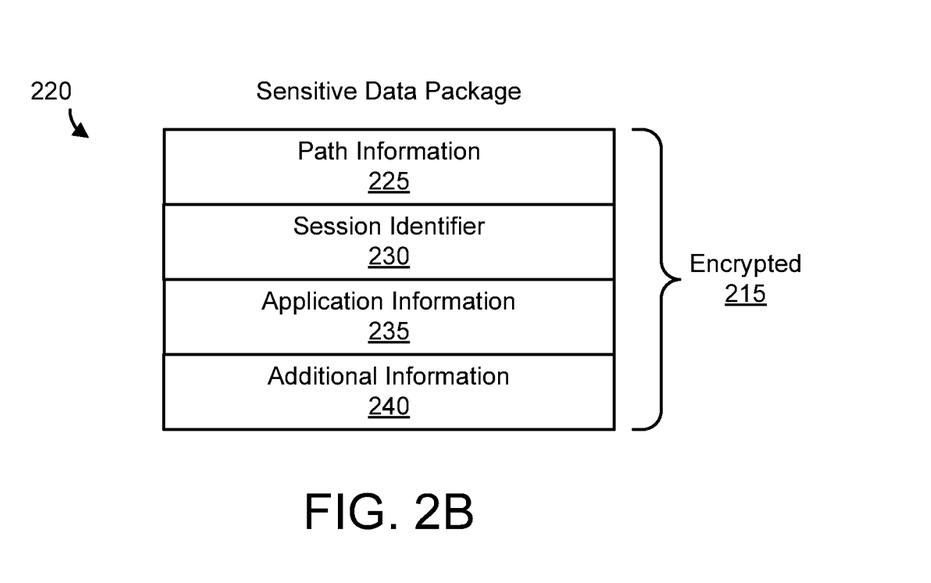
FIG. 2B is a schematic block diagram illustrating one embodiment of a sensitive data package.

FIG. 2B is a schematic block diagram illustrating one embodiment of a sensitive data package 220. In certain embodiments, the sensitive data package 220 includes identity information based on a currently established data session between the client (e.g., the electronic device 110) in the server 105, but does not include the main session information for the data session. In other embodiments, the sensitive data package 220 includes the minimum amount of session related data needed by the client application 125. The sensitive data package 220 may be organized as a data structure that is communicated between the server 105 and electronic device 110 over secure connection.

In one embodiment, the sensitive data package 220 is created in response to the server 105 receiving a launch request or access request. In another embodiment, the sensitive data package 220 is created when the electronic device 110 first initiates a data session with the server 105. For example, the sensitive data package 220 may be created when the browser 120 begins a data session with the server 105, but may not be associated with a claim number until a claim generation request (e.g., launch request or access request 200) is received. In certain embodiments, the sensitive data package 220 may be created after user authentication (e.g., via the authentication module 130).

The sensitive data package 220 may be stored in a memory of the server 105 at a location indicated by the claim number 205. Additionally, the sensitive data package 220 may be transferred to the electronic device 110 and locally stored on the electronic device 110. In the depicted embodiment, the sensitive data package 220 includes path information 225, a session identifier 230, and application information 235. In some embodiments, the sensitive data package 220 may include additional sensitive information 240.

In some embodiments, the server 105 securely stores the sensitive data package 220. In one embodiment, securely storing the sensitive data package 220 includes restricting access memory location wherein the sensitive data package 220 is stored. In another embodiment, sensitive data package 220 is encrypted 215 by the server 105 prior to storing the sensitive data package 220 in memory. In some embodiments, the sensitive data package 220 is only stored for up to a predetermined amount of time (e.g., a brief period of time). For example, the server 105 may delete the sensitive data package 220 if it is not retrieved within the predetermined amount of time. Further, the server 105 may delete the sensitive data package 220 after retrieval, even if the predetermined amount of time has now been reached. As a result, after retrieval of the sensitive data package 220 the claim number 205 cannot be used again at a later point in time retrieve a sensitive data package 220 belonging to another user.

The path information 225 may specify a particular path for accessing the server 105 over the network 115. In one embodiment, the path information 225 may include a network path describing the location of user data used in a session of the server application 140. In another embodiment, the path information 225 may include a uniform resource locator (URL) used to access the server 105. In certain embodiments, path information 225 may be embodied in a browser cookie (e.g., an HTTP cookie).

The session identifier 230 may identify a particular session among a plurality of application sessions hosted by the server application 140. In some embodiments, this session identifier 230 may be associated with a particular session history used by either the client application 125 or the server application 140 in an ongoing application session. In one embodiment, the session identifier may refer to a HTTP session and/or a security session between the server 105 and the electronic device 110. In another embodiment, the session identifier 230 may identify a transport layer session (e.g., a TCP session) between the server 105 and electronic device 110. In certain embodiments, the session identifier 230 may be embodied in a browser cookie.

The application information 235 may specify parameters and protocols for accessing the server application 140. In one embodiment, the application information 235 specifies the client application 125 that may be used to access the server application 140.

The additional information 240 is an optional filter may be used to store additional sensitive data relating to a session between the server 105 and electronic device 110. For example, additional identity information based on a currently established data session may be stored has additional information 240. In one embodiment, the additional information 240 may include a browser cookie, such as a persistent cookie outlasts application session. In another embodiment, the additional information 240 may include an authentication status of the electronic device 110.

Figure 2C:
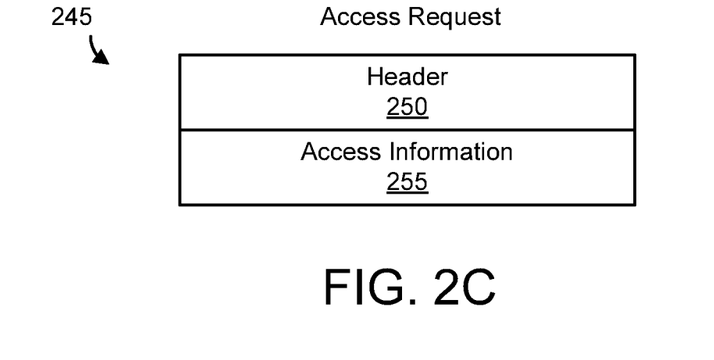
FIG. 2C is a schematic block diagram illustrating one embodiment of an access request.

FIG. 2C is a schematic block diagram illustrating one embodiment of an access request 245. The access request 245 is a claim generation request triggering the generation of the claim number 205. As depicted, the access request 245 may include a header 250. The header 250 may include a sender address, such as the network address of the electronic device 110. The server 105 may verify future requests come from the same electronic device 110 by comparing the network address included in the header 250. The access request 245 may also include access information 255.

The access information 225 includes information regarding a server application 140 and/or user data 135 for which the electronic device 110 requests access. In one embodiment, the access information 255 may include a device identifier for the electronic device 110 (e.g., a unique device identifier (UDID) of the electronic device 110), an application identifier for the client application 125 and/or the server application 140 (e.g., a global unique software identifier (GUID) the client application 125 and/or the server application 140), and/or another identifier of the electronic device 110, the client application 125, or the server application 140. In another embodiment, the access information 255 may include the user credential, such as a username, through which the server 105 may authenticate the user of the electronic device 110 via the authentication module 130.

Figure 2D:
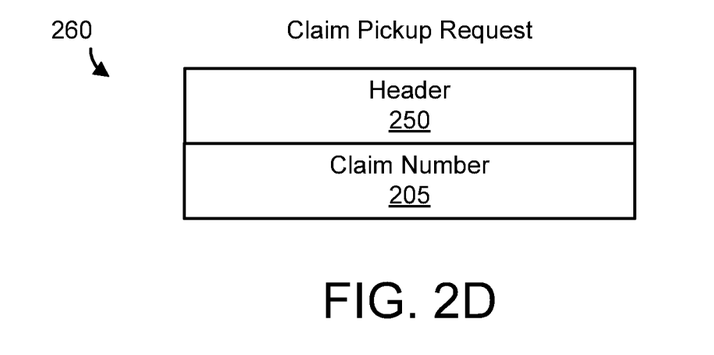
FIG. 2D is a schematic block diagram illustrating one embodiment of a claim pickup request.

FIG. 2D is a schematic block diagram illustrating one embodiment of a claim pickup request 260. In some embodiments the claim pickup request 260 is made via a web service and/or a web service API (e.g., a RESTful API). As depicted, the claim pickup request 260 may include a header 250 and a claim number 205. The header 250 includes the server address 210 and a sender address, such as the network address of the electronic device 110. The claim number 205 may be generated by the server 105 in response to an access request 245. In response to receiving the claim pickup request 260, the server 105 may compare the sender address of the claim pickup request 260 to the sender address of an access request 245 associated with the claim number 205 in order to verify that the access request 245 and claim pickup request 260 come from the same electronic device 110.

The claim pickup request 260 must be requested by the same machine (e.g., electronic device 110) as the access request 200. In some embodiments, the server 105 compares IP addresses and/or MAC addresses associated with the access request 200 and claim pickup request 260 to verify that they come from the same electronic device 110. If the access request 245 and the claim pickup request 260 come from the same electronic device 110, then the server 105 retrieves (and returns) a sensitive data package 220 associated with the claim number 205. Otherwise, if the requests 245 and 260 come from different electronic devices 110, then the server 105 ignores the claim pickup request 260.

Figure 3:
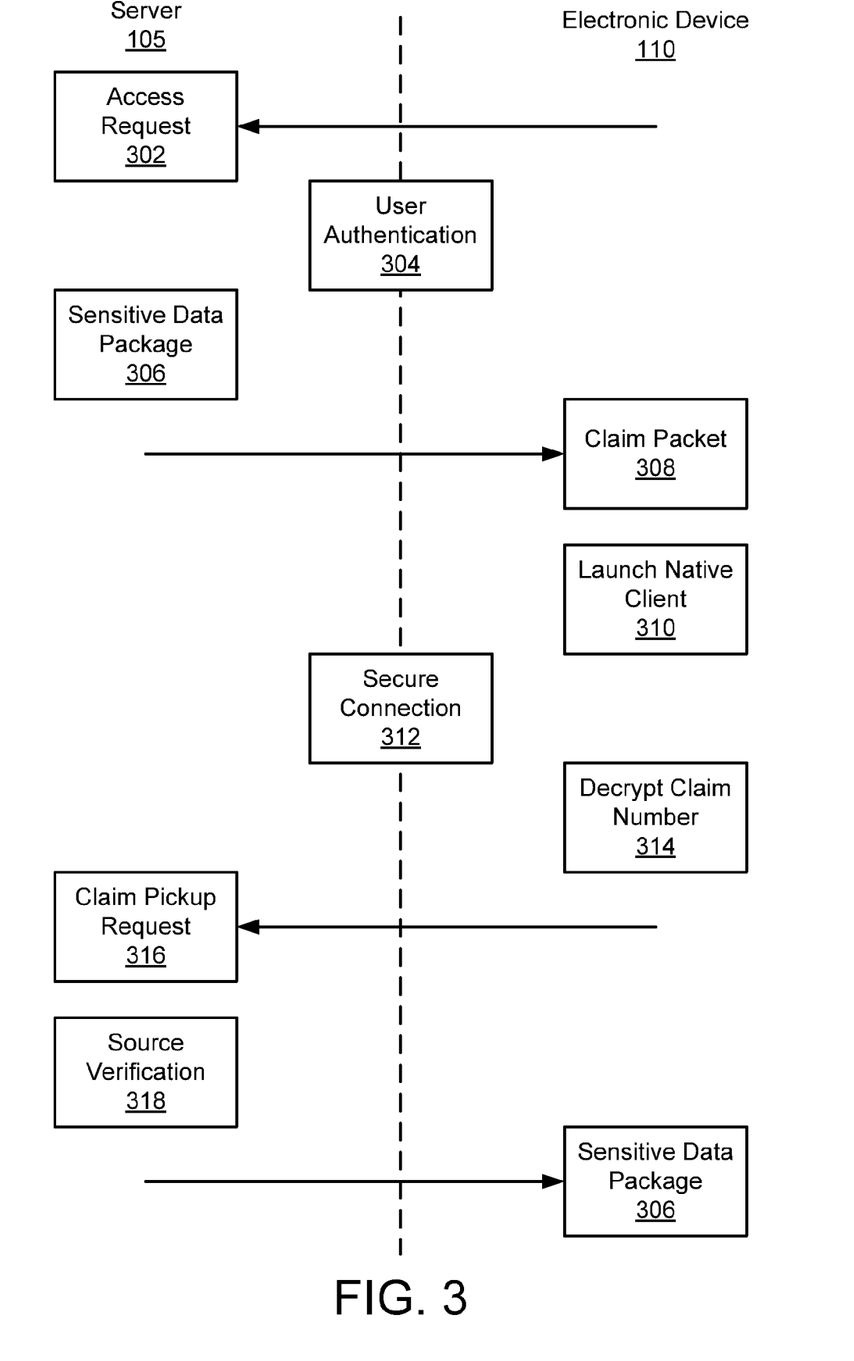
FIG. 3 is a schematic block diagram illustrating one embodiment of data creation and flow when securely communicating sensitive data between a client and a server using claim numbers.

FIG. 3 is a schematic block diagram illustrating one embodiment of data creation and data flow between the server 105 and electronic device 110. In the depicted embodiment, the electronic device 110 makes an access request 302, for example via the browser 120. In one embodiment, the access request 302 is substantially similar to the access request 245 described above with reference to FIG. 2C. In certain embodiments, the server 105 provides a link in the browser 120 to launch the client application 125 on a local system (e.g., the electronic device 110) in response to receiving the access request 245. In another embodiment, the access request 245 is generated in response to a user clicking on a link in the browser 120 for launching the client application 125.

The server 105 receives the access request 302 and, in one embodiment, proceeds to authenticate 304 a user of the electronic device 110 using the authentication module 130. In some embodiments, the server 105 pushes down a client application 125 electronic device 110 in response to authenticating 304 the user. In further embodiments, the electronic device 110 installs and launches the client application 125.

In response to the access request 302, the server 105 creates a sensitive data package 306. In one embodiment, the sense of data package 306 may be substantially similar to the sensitive data package 220 described above with reference to FIG. 2B. In response to the creating the sensitive data package 306, the server 105 also generates a claim packet 308 and delivers it to the electronic device 110. In one embodiment, the claim packet 308 is substantially similar to the claim packet 200 described above with reference to FIG. 2B. In some embodiments, the claim packet 308 is delivered to the browser 120 which then passes the claim packet 308 to the client application 125.

The electronic device 110 launches the native client 310. In one embodiment, the native client 310 is the client application 125 described above with reference to FIG. 1. In another embodiment, the native client 310 is a shim application used to download and execute the client application 125. For example, the native client 310 may check for updates to the client application 125 (and update the client application 125 if needed) prior to excluding the client application 125. While depicted as occurring in response to receipt of the claim packet 308, in one embodiment the electronic device 110 launches the native client 310 in response to sending the access request 302 such that the claim packet 308 is received by the native client 310 (e.g., by the client application 125)

After launching the native client 310, the electronic device 110 and the server 105 establish a secure connection 312. In one embodiment, the secure connection 312 includes a HTTPS session. In certain embodiments, establishing this secure connection 312 includes exchanging security keys, security tokens, and/or security certificates between the server 105 and electronic device 110. While depicted as occurring after the launch of the native client 310 in one embodiment, the secure connection 312 as established prior to and/or concurrently with launching the native client 310.

The client application 125 decrypts the claim number 314 from the claim packet 308. In one embodiment, the claim packet 308 is encrypted/decrypted using a secret shared between the server 105 and the electronic device 110. In another embodiment, the claim packet 308 is encrypted/decrypted using a private-public key pair belonging to either the server 105 or the electronic device 110.

In response to deciphering the claim number 314, the client application 125 makes a claim pickup request 316 that includes the decrypted claim number 314. In one embodiment, the claim pickup request 316 is substantially similar to the claim pickup request 260 described above with reference to FIG. 2D. in response to receiving the claim pickup request 316 the server 105 performs a source verification 318 to ensure that the same electronic device 110 that may be access request 302 is also making the claim pickup request 316. In one embodiment, the source verification 318 includes comparing the network address of the sender of the access request 302 with the network address of the sender of the claim pickup request 316.

After the source verification 318, the server 105 retrieves the sensitive data package 306 indicated by the decoded claim number 314. In one embodiment, the claim number points to a memory location of the server 105 where the sensitive data package 306 is stored. The server 105 also returns the sensitive data package 306 to the client application 125 as a response to the claim pickup request 316.

Figure 4:
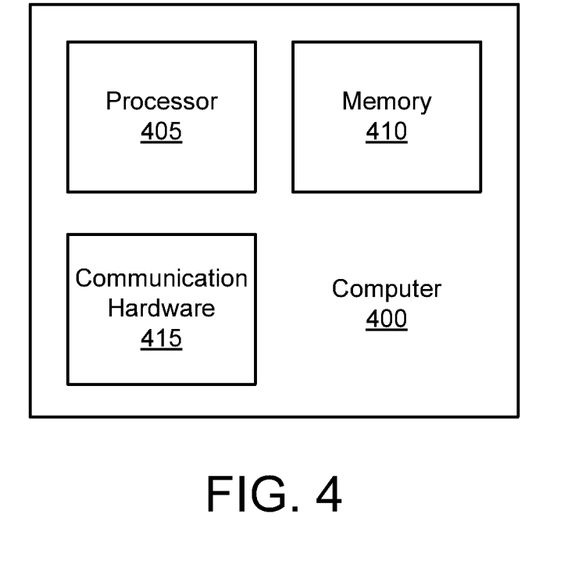
FIG. 4 is a schematic block diagram illustrating one embodiment of a computer for securely communicating sensitive data using claim numbers.

FIG. 4 is a schematic block diagram illustrating one embodiment of a computer 400. The computer 400 may be embodied in the server 105. In addition, the computer 400 may be embodied in the electronic device 110. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. For example, the communication hardware 415 may communicate with the network 115.

Figure 5:
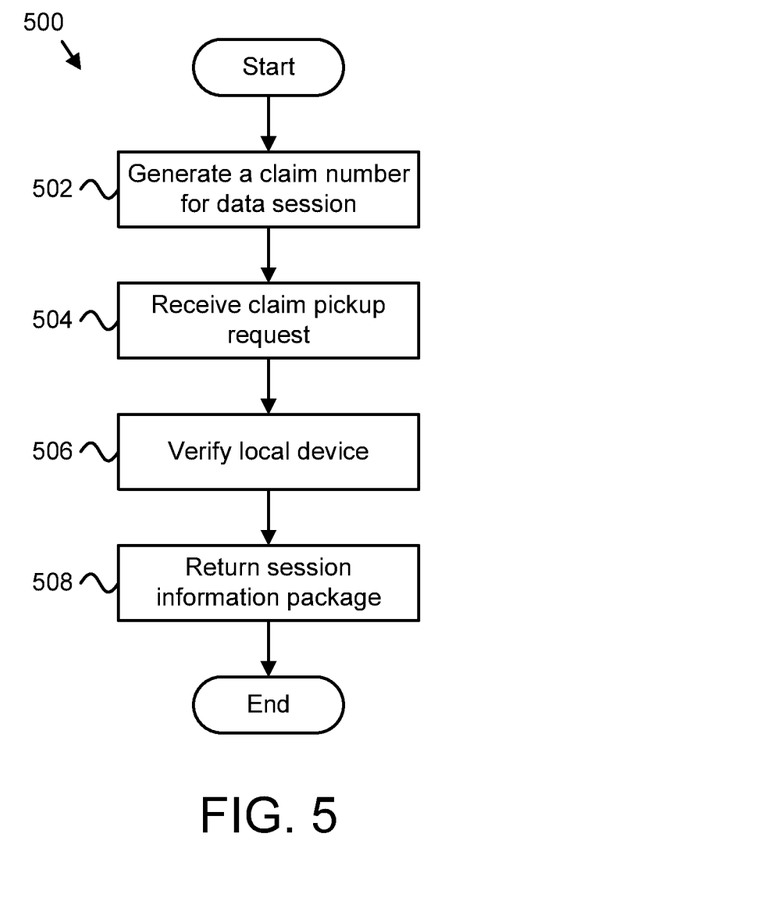
FIG. 5 is a schematic flow chart diagram illustrating one embodiment of a method for securely communicating sensitive data using claim numbers.

FIG. 5 is a schematic flow chart diagram illustrating one embodiment of a method 500 for securely communicating sensitive data using claim numbers. The method 500 securely communicates a session information package, such as the sensitive data package 220, from the server 105 to the electronic device 110. The method 500 may be performed by a processor 405. Alternatively, the method 500 may be performed by computer readable storage medium such as the memory 410. The computer readable storage medium may store code that is executed by the processor 405 to perform the functions of the method 500.

The method 500 starts, and in one embodiment, the server 105 generates 502 a claim number 205 for a data session of a local device (e.g., the electronic device 110). The claim number 205 may be generated 502 in response to an access request 245 sent from a browser 120 executing on the local device. In one embodiment, the access request 245 may request access to the server application 140. In some embodiments, generating 502 the claim number 205 includes creating a claim packet 200 comprising the claim number 205 and a server address 210 and sending the claim packet hundred to the electronic device 110. In further embodiments, the claim packet 200 is encrypted before being transmitted to the electronic device 110.

The server 105 may receive 504 a claim pickup request 260 from a client application, such as the client application 125. The claim pickup request 260 includes the claim number 205 previously generated by the server 105. In one embodiment, the client application 125 transmits a claim pickup request 260 in response to receiving the claim packet 200 and decrypted the claim number 205. In another embodiment, receiving 504 this claim pickup request 260 includes receiving the claim pickup request 260 at the server address 210 included in the claim packet 200.

The server 105 verifies 506 that the client application 125 is executing on a local device (e.g., electronic device 110). In one embodiment, the verifying 506 the local device includes determining whether a network address associated with a sender of an access request 245 is the same as the network address associated with the claim pickup request 260.

In response to receiving 504 the claim pickup request 260 and verifying 506 the client application 125, the server 105 returns 508 a session information package for the data session based on the claim number 205. In one embodiment, the session information package includes a sensitive data package 220, as described above with reference to FIG. 2B. In another embodiment, the session information package includes identity information and/or authentication information. In one embodiment, the server 105 and the local device establish a secure network connection prior to the server 105 returning the session information package, wherein returning 508 the session information package comprises transmitting the sensitive data package 220 over the secure network connection. The method 500 ends.

Figure 6:
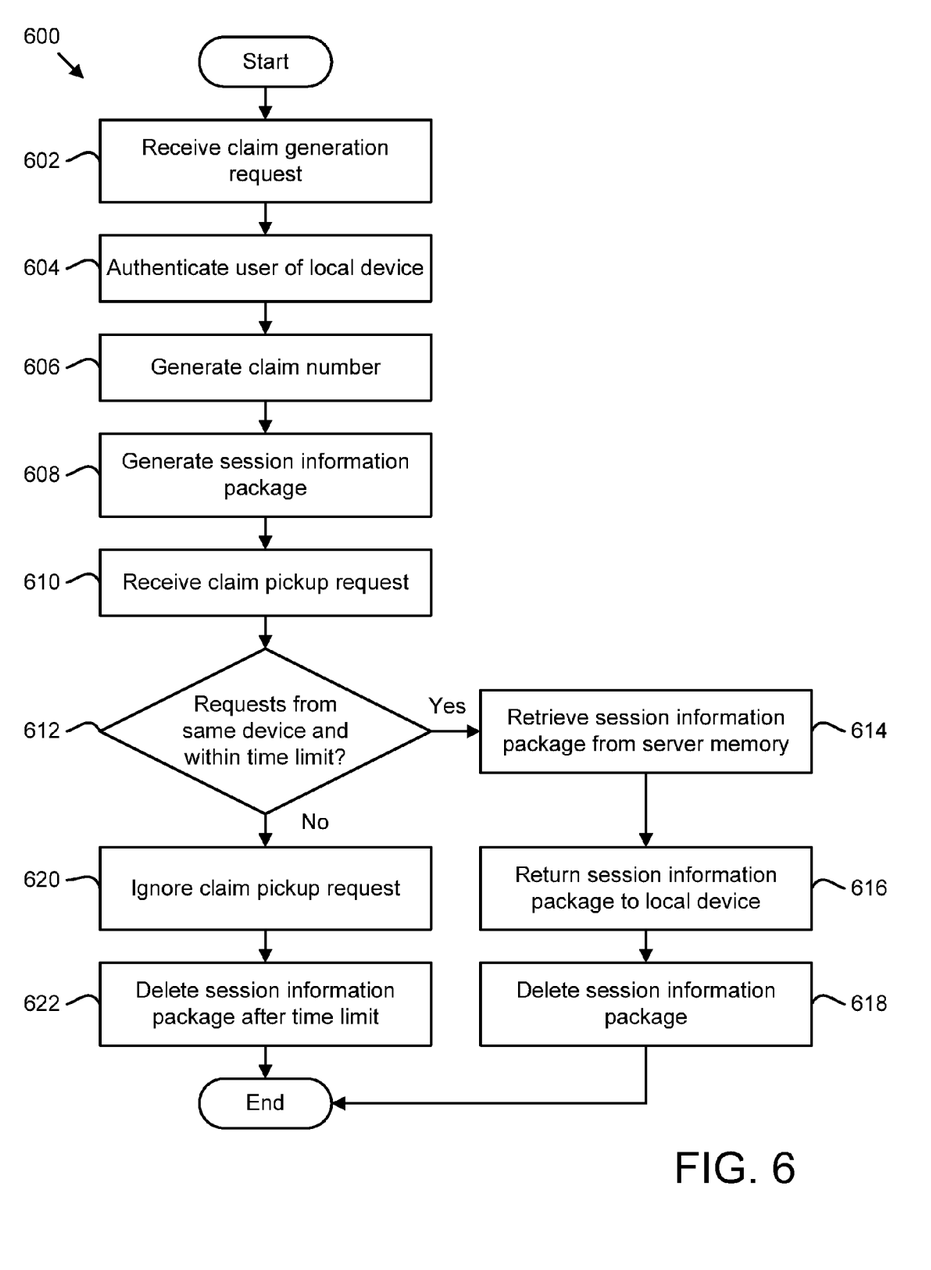
FIG. 6 is a schematic flow chart diagram illustrating another embodiment of a method for securely communicating sensitive data using claim numbers.

FIG. 6 is a schematic flow chart diagram illustrating one embodiment of a method 600 for securely communicating sensitive data using claim numbers. The method 600 securely communicates a session information package, such as the sensitive data package 220, from the server 105 to the electronic device 110. The method 600 may be performed by a processor 405. Alternatively, the method 600 may be performed by computer readable storage medium such as the memory 410. The computer readable storage medium may store code that is executed by the processor 405 to perform the functions of the method 600.

The method 600 starts, and in one embodiment, the server 105 receives 602 a claim generation request (e.g., an access request 245 or launch request) from a web browser 120 executing on a local device (e.g., the electronic device 110). In one embodiment, the claim generation request includes a request to establish a data session between a server application 140 and a client application 125 on the local device.

The authentication module 130 may authenticate 604 the user of the local device to the server 105. For example, authenticating 604 the user may include the server 105 receiving a username and password (or other user credentials) for access to the server replication 140 from the user via the authentication module 130.

In response to authenticating 604 the user, the server 105 generates 606 a claim number 205 for a data session of a local device (e.g., the electronic device 110). In some embodiments, generating 606 the claim number 205 includes generating a unique claim number. In one embodiment, the server 105 downloads the client application 125 to the local device, wherein the claim number 205 is generated 606 in response to downloading the client application 125.

In certain embodiments, generating 606 the claim number 205 includes creating a claim packet 200 including the claim number 205 the server address 210 and sending the claim packet 200 to the electronic device 110. In further embodiments, the claim packet 200 is encrypted before being transmitted to the electronic device 110.

The server 105 may also generate 608 a session information package for the data session of the local device. The session information package is stored at a memory location on the server referenced by the claim number 205 and includes sensitive data whose interception would compromise user data on the server. In one embodiment, the session information package comprises a sensitive data package 220 as described above with reference to FIG. 2B. In some embodiments, generating 608 the session information package includes encrypting the session information package. In certain embodiments, generating 608 the session information package include storing the session information package in a secure server memory location where access is restricted.

The server 105 receives 610 a claim pickup request 260 including the claim number 205. In one embodiment, the claim pickup request 260 is addressed to the server address 210 included in the claim packet 200. The server 105 determines 612 whether the local device sent the claim pickup request 260 and whether the claim pickup request 260 was received within a predetermined time period from the creation of the claim number 205. In one embodiment, determining 612 whether the same local device sent the claim generation request and the claim pickup request 260 includes comparing a network address associated with the claim generation request with a network address associated with the claim pickup request 260.

If the local device (e.g., the electronic device 110) sent both requests and the claim pickup request 260 was received within the predetermined time period, then the server 105 retrieves 614 a session information package corresponding to the claim number 205 and returns it 616 to the local device. In one embodiment, the server 105 deletes 618 the session information package from its memory after delivering it to the local device.

Otherwise, if either the local device did not send both requests or if the claim pickup request 260 is not received within a predetermined time period, then the server 105 ignores 620 the claim pickup request 260. In one embodiment, the server 105 deletes 622 the session information package in response to the session information package not being retrieved within the predetermined time period. The method 600 ends.

The embodiments support protecting sensitive information (e.g., sensitive data package 220) by using a claim number 205 instead of passing the sensitive, session related data in plaintext to the client application 125. Using the claim number 205 preserves in confidentiality the sensitive, session related data and ensures that the sensitive data is not passed in plaintext over an unsecured connection. The claim number 205 is used as a pointer to reference a memory location on the server 105 where the sensitive information is stored. For example, the claim number 205 may be used to retrieve a session transfer key, identity information, authentication information, or other sensitive information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a server comprising:
   a processor;
   a memory that stores code executable by the processor to:
   receive, at the server, an access request from a web browser executing on a local device;
   generate, at the server, a claim number associated with a data session associated with the local device, wherein the claim number is a pointer for a secure storage area of the server memory, wherein the claim number is unique to the server generating the claim number;
   receive a claim pickup request from a client application, the claim pickup request including the claim number, wherein the claim pickup request is a request to retrieve sensitive data associated with the claim number, wherein the client application and the web browser are separate applications from one another;
   determine whether the sender of the access request and the sender of the claim pickup request correspond to the same local device, responsive to the claim pickup request;
   determine whether the claim pickup request is received within a predetermined time period from the generation of the claim number;
   retrieve a sensitive data package for the data session from a location in the server memory based on the claim number, responsive to the access request and the claim pickup request being received from the same local device;
   delete the sensitive data package from the server in response to retrieving the sensitive data package; and
   delete the sensitive data package in response to not receiving the claim pickup request within the predetermined time period.

2. The apparatus of claim 1, wherein the processor further establishes a secure network connection between the server and the local device, wherein the claim pickup request is received in response to establishing the secure network connection.

3. The apparatus of claim 1, wherein the processor further:
   generates the sensitive data package for the data session; and
   securely stores the sensitive data package in a server memory.

4. The apparatus of claim 3, wherein securely storing the sensitive data package in a server memory comprises encrypting the sensitive data package.

5. The apparatus of claim 1, wherein the processor further:
   generates a claim packet in response to receiving the access request, the claim packet including the claim number and a server address, wherein the claim number is unique to a server identified by the server address;
   encrypts the claim packet; and transmits the encrypted claim packet to the client application executing on the local device.

6. The apparatus of claim 5, wherein determining whether the sender of the access request and the sender of the claim pickup request correspond to the same local device comprises comparing an Internal Protocol ("IP") address associated with the access request to an IP address associated with the claim pickup request.

7. The apparatus of claim 5, wherein receiving the claim pickup request comprises receiving a claim pickup request addressed to the server address included in the claim packet.

8. The apparatus of claim 1, wherein the processor further authenticates a user at the local device, wherein generating the claim number occurs in response to authenticating the user.

9. The apparatus of claim 1, wherein generating the claim number associated with the data session comprises generating a claim number unique to the data session.

10. A method comprising:
receiving, at a server, an access request from a web browser executing on a local device;
generating, by use of a processor, a claim number associated with a data session of the local device, wherein the claim number is a pointer for a secure storage area of the server, wherein the claim number is unique to the server;
receiving a claim pickup request from a client application, the claim pickup request including the claim number, wherein the claim pickup request is a request to retrieve sensitive data associated with the claim number, wherein the client application and the web browser are separate applications from one another;
verifying that the sender of the access request and the sender of the claim pickup request correspond to the same local device, responsive to the claim pickup request;
determining whether the claim pickup request is received within a predetermined time period from the generation of the claim number;
returning a session information package for the data session from a memory location in the server based on the claim number, in response to the claim pickup request and in response to the access request and the claim pickup request being received from the same local device;
deleting the session information package from the server memory in response to returning the session information package; and
deleting the session information package in response to not receiving the claim pickup request within the predetermined time period.

11. The method of claim 10, further comprising downloading the client application to the local device, wherein the claim number is generated in response to downloading the client application.

12. The method of claim 10, the code further comprising:
authenticating a user on the local device; and
generating the session information package in response to authenticating the user.

13. The method of claim 10, the code further comprising:
generating a claim packet comprising the claim number and a server address;
encrypting the claim packet; and
transmitting the encrypted claim packet to the client application, wherein the claim pickup request is received responsive to sending the claim packet.

14. The method of claim 13, wherein receiving the claim pickup request comprises receiving a claim pickup request addressed to the server address included in the claim packet.

15. A program product comprising a computer readable storage medium, that is not a transitory signal, that stores code executable by a processor, the executable code comprising code to perform:
receiving, at a server, an access request from a web browser executing on a local device;
generating a claim number for sensitive session information related to the local device, wherein the claim number is a pointer for a secure storage area of the server memory, wherein the claim number is unique to the server;
receiving a claim pickup request from a client application, the claim pickup request including the claim number, wherein the claim pickup request is a request to retrieve sensitive session information associated with the claim number, wherein the client application and the web browser are separate applications from one another;
verifying that the local device sent the claim pickup request;
determining whether the claim pickup request is received within a predetermined time period from the generation of the claim number;
returning a session information package to the local device from a memory location in the server based on the claim number in response to the access request and the claim pickup request being received from the same local device, wherein the session information package includes the sensitive session information;
deleting the session information package from the server memory in response to returning the session information package; and
deleting the session information package in response to not receiving the claim pickup request within the predetermined time period.

16. The program product of claim 15, wherein verifying that the local device sent the claim pickup request comprises comparing a network address associated with the access request with a network address associated with the claim pickup request.

17. The program product of claim 15, the executable code further comprising code to perform:
generating a claim packet in response to generating the claim number, the claim packet including the claim number and a server address;
encrypting the claim packet; and
transmitting the encrypted claim packet to the client application, wherein the claim pickup request is addressed to the server address.

18. The program product of claim 15, the executable code further comprising code to perform:
establishing a secure network connection between the server and the local device, wherein returning the session information package comprises transmitting the session information package over the secure network connection.

* * * * *